Dec. 21, 1926.
K. MAYBACH
1,611,545
MECHANISM FOR ACTUATING MOTOR CLUTCHES IN MOTOR VEHICLES
Filed Jan. 23, 1925
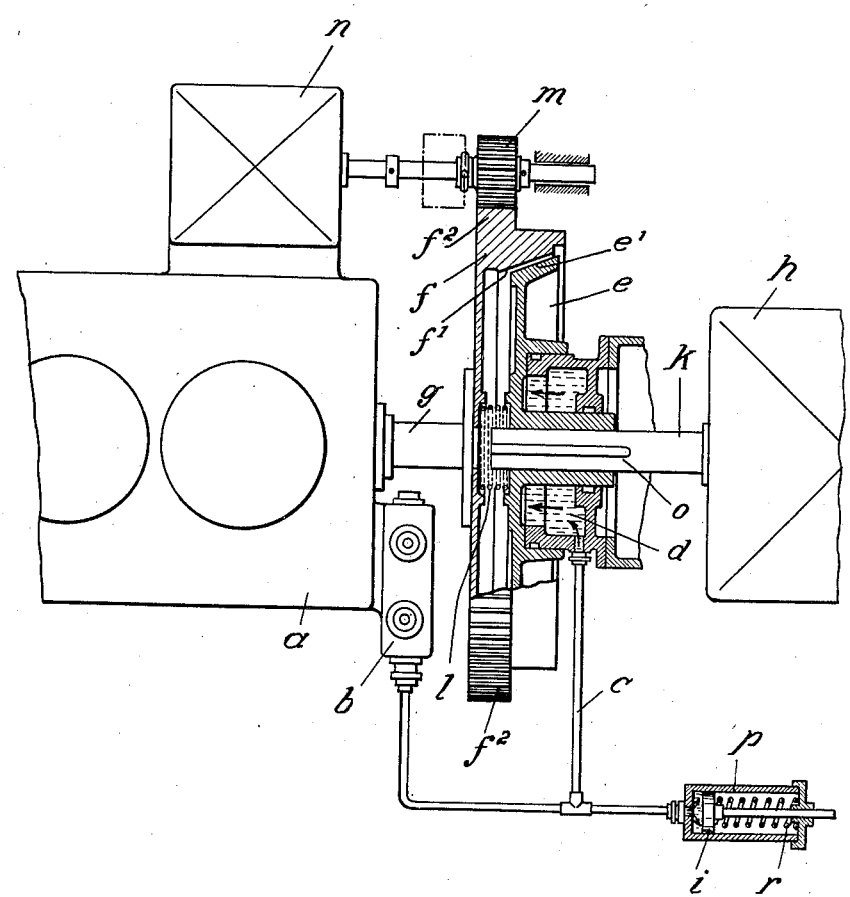
Inventor:
Karl Maybach Patented Dec. 21, 1926.

1,611,545

UNITED STATES PATENT OFFICE.

KARL MAYBACH, OF FRIEDRICHSHAFEN, BODENSEE, GERMANY, ASSIGNOR TO MAYBACH MOTORENBAU GESELLSCHAFT MIT BESCHRANKTER HAFTUNG, OF FRIEDRICHSHAFEN, BODENSEE, GERMANY.

MECHANISM FOR ACTUATING MOTOR CLUTCHES IN MOTOR VEHICLES.

Application filed January 23, 1925, Serial No. 4,264, and in Germany February 4, 1924.

The invention relates to improvements in mechanisms for actuating the motor clutch in motor vehicles, i. e. the clutch situated between the motor and the transmission gear of the vehicle. The inventive mechanisms are adapted to facilitate the controlling action when the vehicle starts and it is intended to attain this starting more smooth and free from shocks.

It is desirable in vehicles accomplished with a starting machine of normal dimensions as usual, to start the vehicle in a direct manner i. e. without the use of several steps in the controlling action and whereby it is especially desired to avoid the free run position, all that for the purpose that after starting of the motor the driver has not to actuate the motor clutch in any manner In employing the mechanisms according to my invention it is possible in a vehicle accomplished with a starting machine of usual dimensions to start directly and free of shocks in such a manner that a special actuating of the motor clutch is avoided and that the starting action will not depend on the individual skill of the driver. This is obtained in such a manner that the clutch interposed between the motor and the driving shaft (Cardan shaft) which at stopping position of the motor shaft or the vehicle respectively is loosened, will be brought automatically in its closed and active position by means of a special device which is not identical to controlling means actuated by muscular force. The said automatic device is adapted to begin its action during the starting period in order to bring the motor shaft in driving connection with the gear of the vehicle before the full speed of the motor shaft is reached.

Such an automatic device is also employable in motor vehicles of the kind as cited before, in which the starting machine has sufficient power for direct starting of the vehicle. Here the inventive device is very advantageous if the vehicle has to start on extraordinary rising roads or on roads on which the motoring is often difficult. Hitherto in this type of vehicles it was also necessary to couple in the usual manner with the running motor shaft during the standstill of the vehicle in order to avoid an electric starting machine of unnecesary great dimensions.

According to the invention the motor clutch may be actuated by pressure liquid the pressure of which is produced by means of a pump.

For the purpose to reach every desirable and smooth closing action of the motor clutch either a yielding element can be brought in connection to the movable clutch member, or in the pressure liquid pipe there may be interposed a cylinder with a piston influenced by a spring so that the pressure of the liquid can only gradually reach its maximal amount when the coupling members of the motor clutch are pressed each upon the other.

The figure of the accompanying drawing shows the inventive mechanisms by way of example diagrammatically, partly in a sectional view. The parts are seen in plan.

$a$ denotes the motor of the vehicle and $b$ an oil pressure pump which may be driven by the said motor. The pressure liquid is fed through the pipe $c$ in the chamber $d$ in which the oil will act upon the movable coupling member $e$ so that when it is pressed against the fly wheel $f$ both the friction surfaces $e^1$ and $f^1$ respectively are coming into contact.

The flywheel $f$ is fixed to the motor shaft $g$, while the coupling member $e$ is loosely keyed on the main shaft $k$ of the gear $h$ which latter stands in driving connection to the Cardan shaft (not shown in the drawing). The key is a usual feather $o$.

With the toothed rim $f^2$ of the fly wheel gears the slidable pinion $m$ of the starting machine $n$.

Between the fly wheel $f$ and the movable coupling member $e$ the pressure spring $l$ is located by which the loosening of the clutch is fully effected after diminishing of the oil pressure.

Connected to the liquid piping $c$ is the cylinder $p$ with a piston $i$ in it and a spring $r$ is provided which acts upon the piston $i$.

The working of the whole mechanism will be the following.

When the starting machine is set in function the slidable pinion $m$ is brought from its position of rest (shown in dotted lines) in the working position and gears with the fly wheel $f$ so that the motor will start. The coupling member $e$ remains still in rest.

As soon as the motor has made some revolutions (for instance 5 or 10 R. P. M.) the motor driven pump *b* gives the liquid enough pressure for moving the coupling member *e* against the fly wheel *f*, i. e. the clutch will be closed. By means of the piston *i* actuated by the spring *r* the oil pressure will be gradually increased till the pressure reaches its highest amount.

In further pursuance of the invention a yielding member may be interposed in the transmitting rod mechanism between the hydraulic means and the clutch whereby the advantage is obtained, that the clutch pressure may only reach the highest amount after reaching the point of time at which any influence of the said yielding member is ceased.

I do not want to limit myself to the exact details described or shown in the drawing as many variations will occur to those skilled in the art.

I claim:

1. A starting and coupling mechanism for motor vehicles comprising a motor, a clutch adapted to be automatically operated and means for coupling said clutch, said means being adapted to operate automatically on the starting of said motor.

2. A starting and coupling mechanism for motor vehicles comprising a motor, a starting device for said motor, a clutch adapted to be automatically operated, and means for coupling said clutch, said means adapted to operate automatically on the starting of said motor.

3. A starting and coupling mechanism for motor vehicles comprising a motor, a starting device for said motor, a clutch adapted to be operated automatically, and means for coupling said clutch, said means being adapted to come into operation on the starting of said starting device.

4. A starting and coupling mechanism for motor vehicles comprising a motor, a device for starting said motor, a clutch adapted to be operated by liquid pressure, a pump adapted to create liquid pressure, a liquid in connection with said pump and with said clutch, said pump being in operative connection with said motor.

5. A starting and coupling mechanism for motor vehicles comprising a motor, a device for starting said motor, a clutch adapted to be operated by liquid pressure, a liquid in connection with said pump and with said clutch, said pump being adapted to be driven by said starting device.

6. In a motor vehicle in combination a motor, a fly wheel fixed to the motor shaft, an electric starting machine the pinion of which can gear with the toothed rim of the fly wheel, a transmission shaft being in driving connection with the gear of the vehicle, a motor clutch the one coupling member of which being fixed to the motor shaft while the other coupling member is loosely keyed on the said transmission shaft, automatic means arranged in dependence to the motor and adapted to cause the closing of the motor clutch as soon as the motor shaft, when started by the said starting machine, has completed some of its first revolutions.

7. In a motor vehicle in combination a motor, a fly wheel fixed to the motor shaft, an electric starting machine the pinion of which can gear with the toothed rim of the fly wheel, a transmission shaft being in driving connection with the gear of the vehicle, a motor clutch the one coupling member of which being fixed to the motor shaft while the other coupling member is losely keyed on the said transmission shaft, automatic means consisting in a pressure chamber joining to the said losely keyed coupling member, in a motor driven oilpump and in a pipe leading from the said oilpump to the said pressure chamber, the said automatic means being adapted to cause the closing of the motor clutch as soon as the motor shaft, when started by the said starting machine, has completed some of its first revolutions.

8. In a motor vehicle in combination a motor, a fly wheel fixed to the motor shaft, an electric starting machine the pinion of which can gear with the toothed rim of the fly wheel, a transmission shaft being in driving connection with the gear of the vehicle, a motor clutch the one coupling member of which being fixed to the motor shaft while the other coupling member is loosely keyed on the said transmission shaft, automatic means consisting in a pressure chamber joining to the said loosely keyed coupling member, in a motor driven oilpump, in a connecting pipe and in a cylinder with a spring supported piston, the said automatic means being adapted to cause the gradual closing of the motor clutch as soon as the motor shaft, when started by the said starting machine, has completed some of its first revolutions.

In testimony whereof I affix my signature.

KARL MAYBACH.